Sept. 19, 1967  S. D. ROBINS  3,342,311
BELT TRAINER
Filed Sept. 26, 1966  6 Sheets-Sheet 1
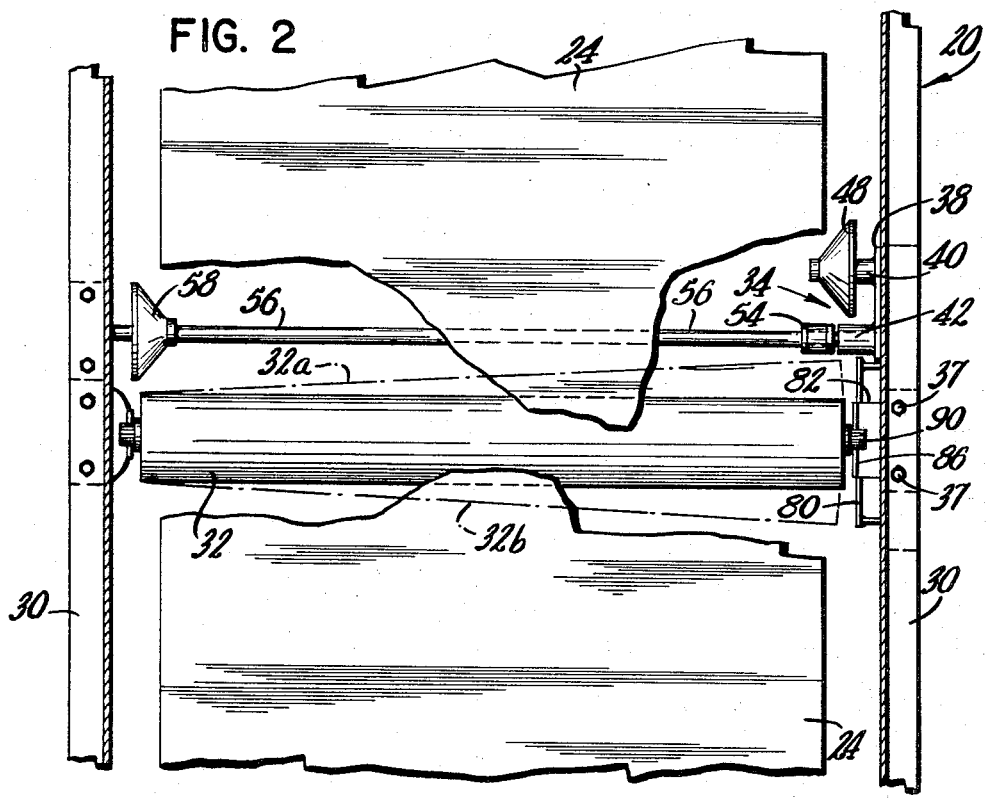
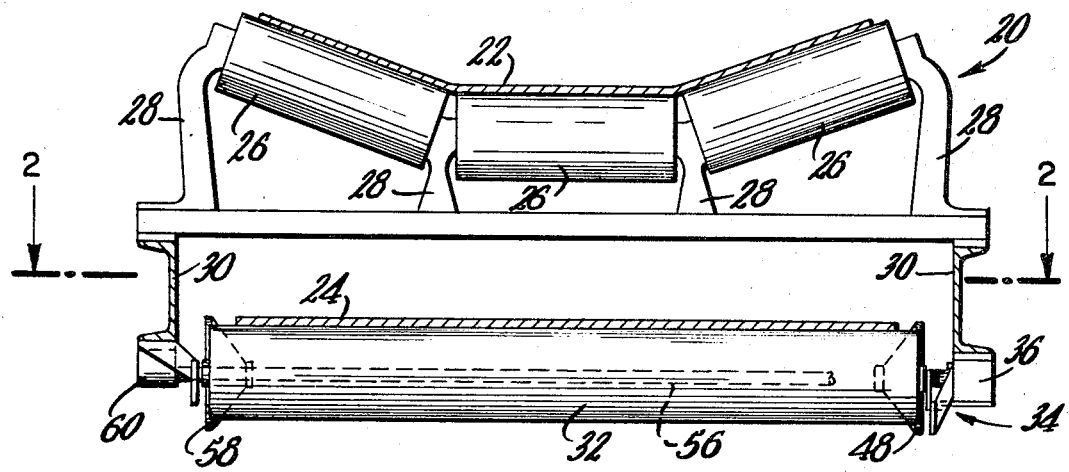
INVENTOR
SAMUEL DAVIS ROBINS
BY
Leonard H. King
ATTORNEY

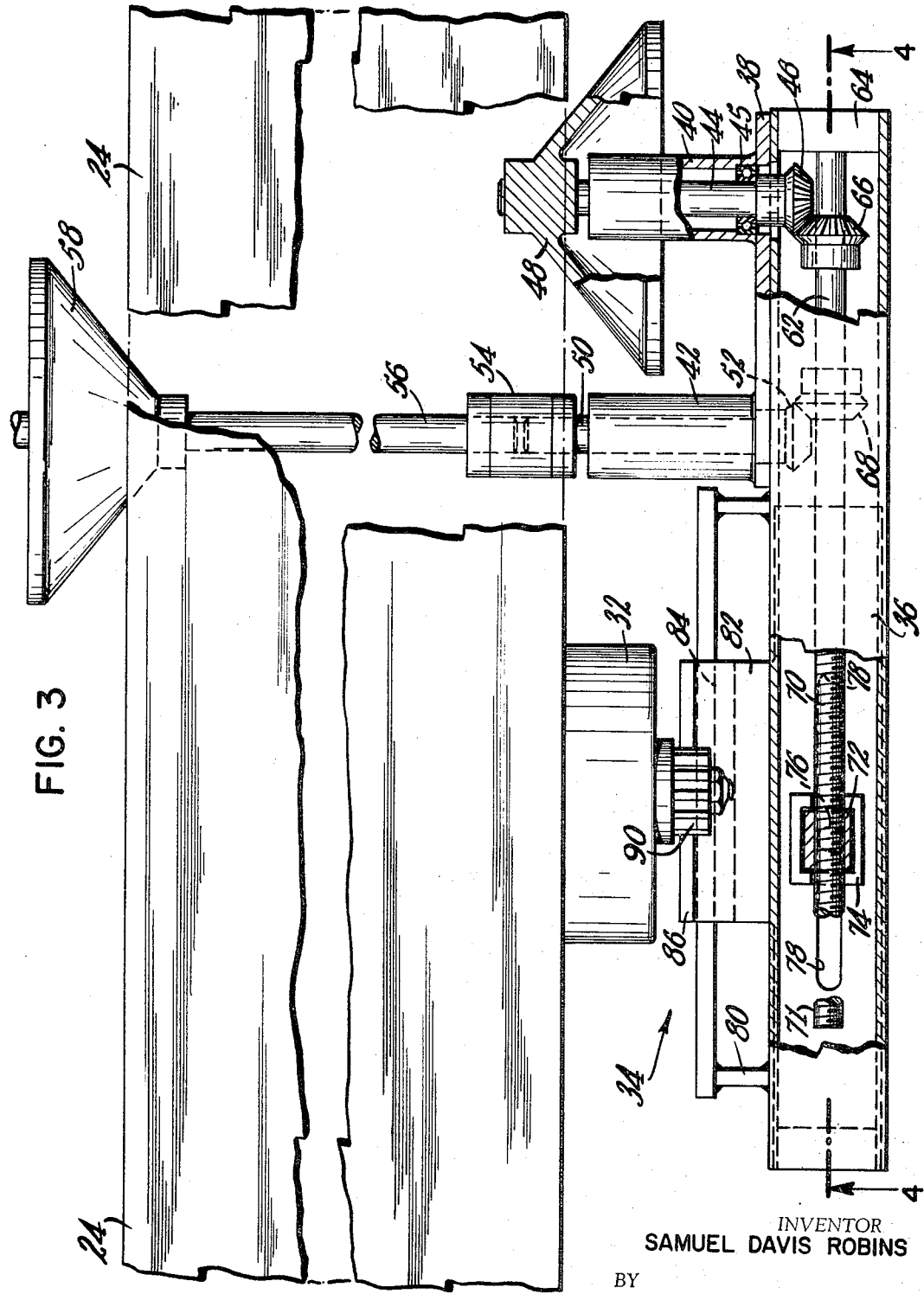

Sept. 19, 1967  S. D. ROBINS  3,342,311
BELT TRAINER
Filed Sept. 26, 1966  6 Sheets-Sheet 3
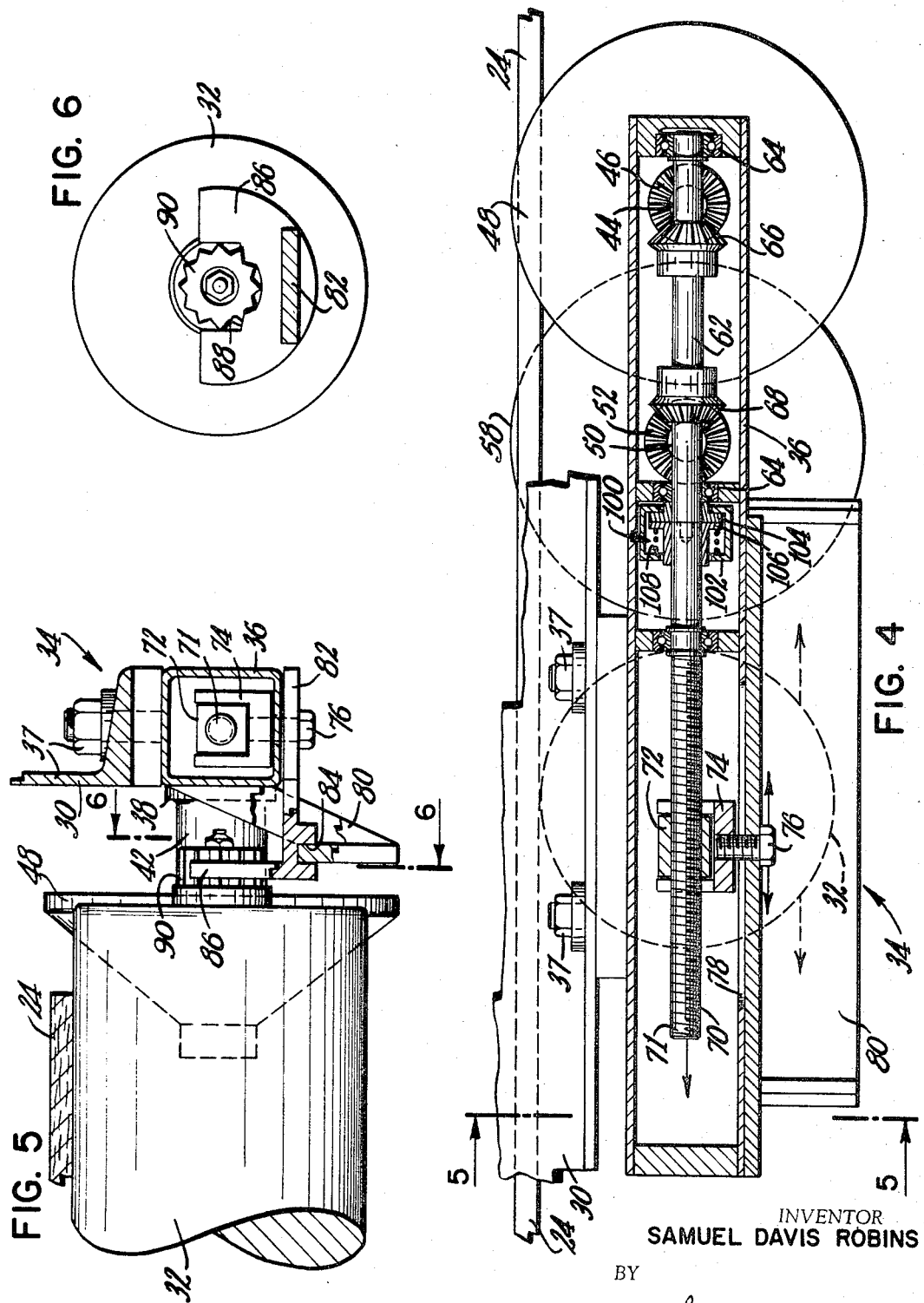
INVENTOR
SAMUEL DAVIS ROBINS
BY
Leonard H. King
ATTORNEY Sept. 19, 1967     S. D. ROBINS     3,342,311
BELT TRAINER
Filed Sept. 26, 1966     6 Sheets-Sheet 4
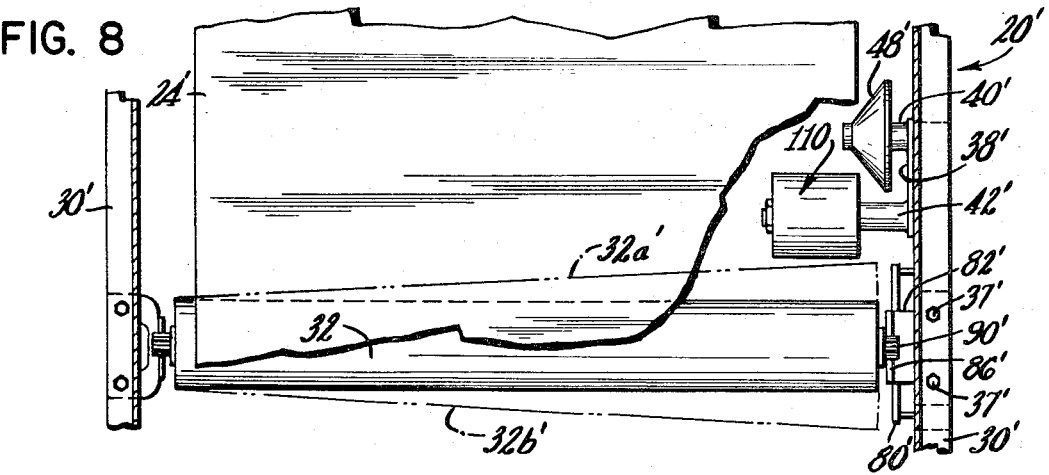
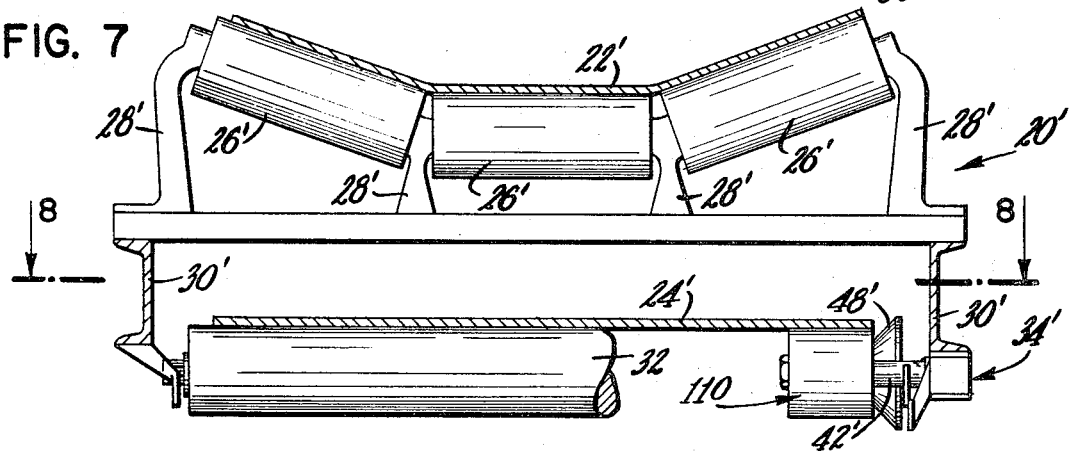
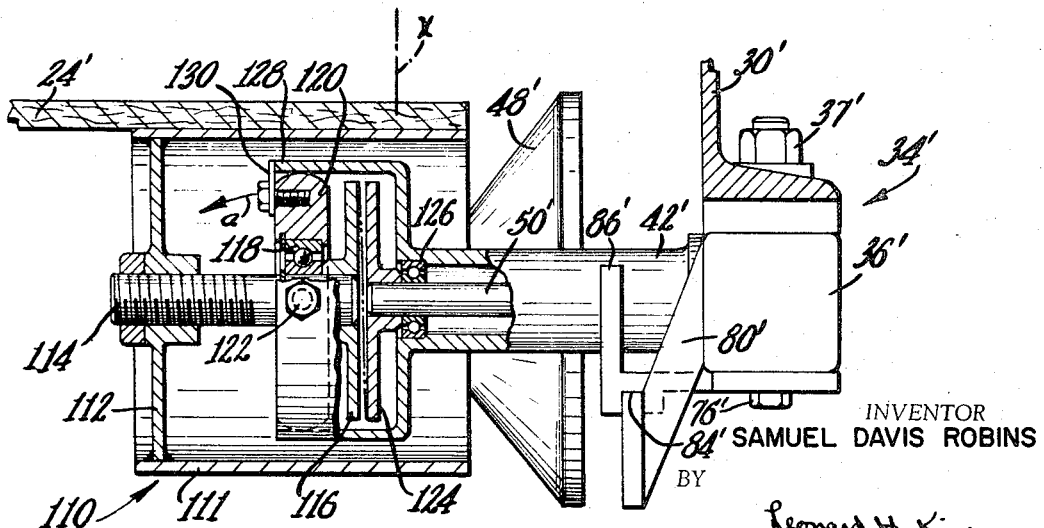
INVENTOR
SAMUEL DAVIS ROBINS
BY
Leonard H. King
ATTORNEY

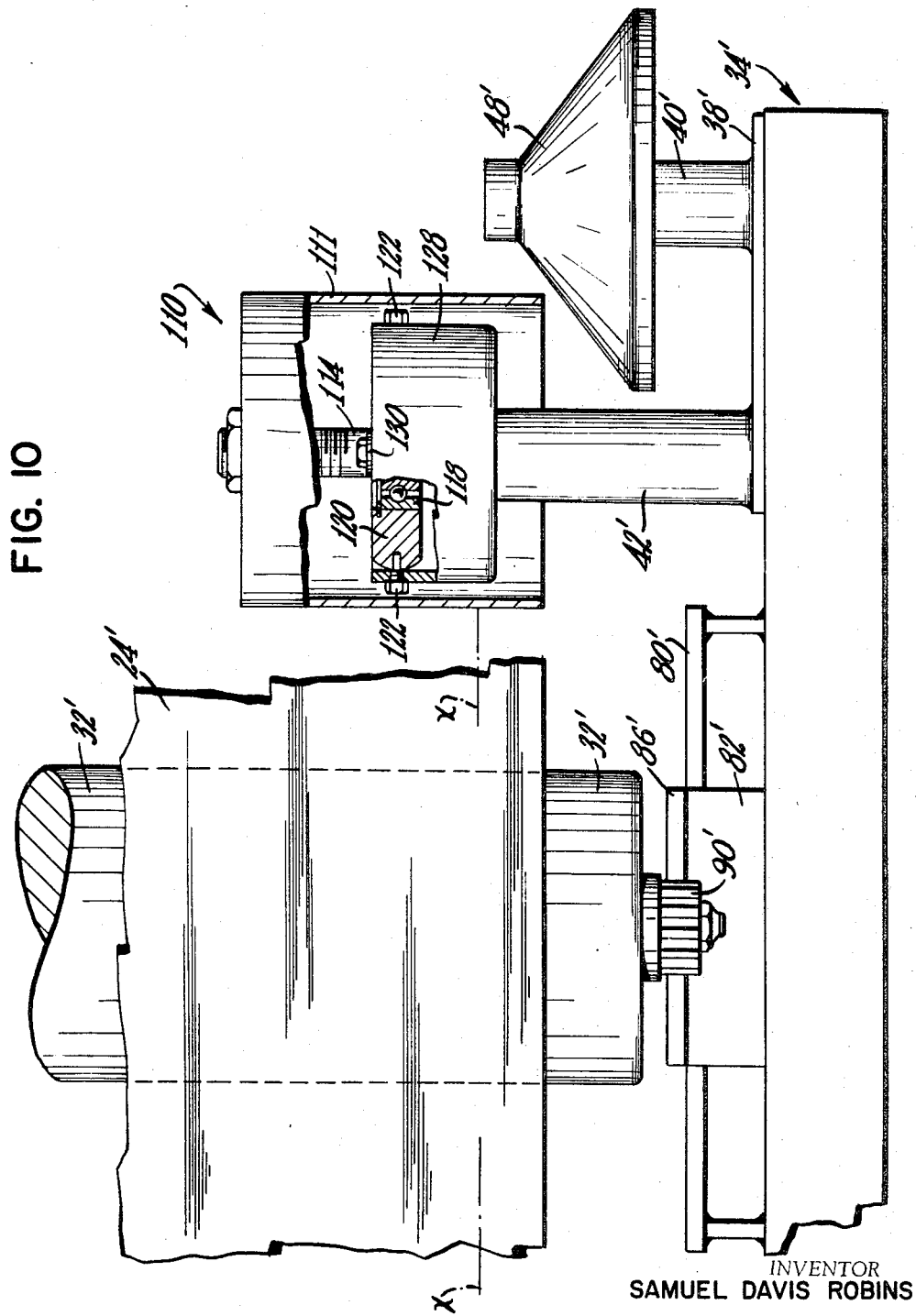

Sept. 19, 1967    S. D. ROBINS    3,342,311
BELT TRAINER

Filed Sept. 26, 1966    6 Sheets-Sheet 6

INVENTOR.
SAMUEL DAVIS ROBINS
BY
Leonard H. King
ATTORNEY

United States Patent Office 3,342,311
Patented Sept. 19, 1967

3,342,311
BELT TRAINER
Samuel Davis Robins, 114 Berkshire Place,
Lawrence, N.Y. 11559
Filed Sept. 26, 1966, Ser. No. 581,809
22 Claims. (Cl. 198—202)

ABSTRACT OF THE DISCLOSURE

This invention relates generally to belt-type conveyors and more particularly to improve belt training apparatus therefor.

---

This invention provides simple and low cost training means that may be easily installed in and utilized with existing conveyor structure in order to automatically detect and compensate for excess lateral straying of a conveyor belt from a normal position. Lateral movement of a conveyor belt greater than a predetermined allowable distance must be sensed in order to avoid damage to the belt. If the belt moves laterally beyond the prescribed distance the edges of the belt will rub and fray on the supporting structure of the conveyor. Unless the straying tendency of the belt is corrected before contact is made with the supporting structure, costly repairs and loss of operating time of the conveyor will result.

It is conventional practice to provide movable idler rollers that are pivotable in a horizontal plane so as to retrain a belt after it has strayed. Normally, only one idler in every ten is a trainer. This ratio is usually sufficient for most belt control purposes. It will therefore be appreciated that the number of belt training rollers required, in proportion to the normal rollers, is relatively small, thus limiting production requirements. An additional deterrent to large scale production is the fact that varying widths of belts require varying widths of trainers. Another restriction to mass production of belt trainers is that conveyors handling sticky materials, for example, require special roller constructions, that is, rubber discs instead of metal tubing. Abrasive conditions require rollers of heavier wall thickness or even cast iron instead of soft steel. It will be evident that this variety of demands, coupled with the necessarily limited usage as compared with standard adler rollers, means that very few trainers are sold of any one particular specification, namely, width and/or type.

Notwithstanding the rather limited training idler market, it is still essential that means be provided for controlling the belt. The conveyor system is very costly and means must be provided for preventing damage thereto. It is necessary that the training idlers and the means to actuate them be inexpensive with respect to structure, installation and maintenance. It would be almost desirable if one of the standard rollers, together with the mounting means therefor, could be used with a training device that is universal and which can be made to act automatically on the existing roller and on any width belt without structural alterations.

Two embodiments of this invention will be illustrated and described in order to point out different variations of the basic concept. It is a common feature to both embodiments that the present invention is useful with any width conveyor belt.

It is another feature of both embodiments of the invention that straying in either lateral direction during movement of the belt in either longitudinal direction will be automatically detected.

Still another feature of both embodiments of this invention is that they may be easily applied to existing conveyor belt installations without structural alterations thereto.

A further feature of both embodiments is that by using a mounting bracket suitable for conventional idler rollers, the sensing and actuating mechanisms of this invention are universal for substantially all of the most commonly used conveyor installations.

In the first embodiment of this invention, the training apparatus acts on one end of a pivotally mounted idler roller of standard configuration. The training apparatus is comprised of sensing means in the form of two opposed rotatable cone members. The sensing means are positioned such that either one of the cones may be engaged and driven by a longitudinal edge of the return run of the conveyor. In the first embodiment a cone member is located on each side of the conveyor belt and one of them is engaged when an external factor, such as an unbalanced load, causes misalignment of the belt in a lateral direction towards that particular cone-shaped roller. The edge of the belt will move towards, engage and rotate the cone and a gear train will be activated thereby. The angularly movable output of the gear train is translated into a linear motion and a suitable coupling arrangement responsive to the linear motion will arcuately displace one end of the standard, pivotally mounted idler roller. Movement of the coupling member pivotally or arcuately deflects the idler roller in a horizontal plane such that the belt thereon is redirected to its proper position. The aforementioned orientation takes place while the belt is moving in either longitudinal direction and the sensing means are responsive to the displacement of the belt in either lateral direction.

The second embodiment of this invention also utilizes two sensing devices but these are both physically positioned next to only one longitudinal edge of the return run of the conveyor belt. In the first embodiment an elongated transverse shaft supports one of the sensing cones proximate the far edge of the belt. The transverse supporting shaft has to be changed in accordance with the width of the conveyor. By way of contrast the second embodiment requires no transverse shaft since the sensing rollers for both directions of lateral belt movement are on the same side of the conveyor. One of the sensing rollers, again a cone member, is driven by the longitudinal edge of a belt that strays in a first lateral direction. The other sensing means is a tubular roller member that is normally balanced but becomes unbalanced in a plane perpendicular to the plane of the belt when the belt moves in the second or opposite lateral direction. Coupling means responsive to both the sensing elements are the same in both embodiments so that the training device may be applied with minimum effort to existing and standard idler rollers. The coupling members include support brackets having a roller receiving socket configuration that is conventional in the industry.

The present invention provides many new and desirable features. All that is necessary, after selecting the return roller that is to be converted to a trainer, is to replace one of the supporting brackets therefor with the sensing and actuator means of either embodiment of this invention. Improved coupling means that is responsive to the actuator means supports one end of the standard roller with freedom for forward and rearward displacement responsive to the sensing mechanism. By definition forward and rearward displacement is taken to be with respect to the longitudinal direction of belt movement.

The compact hardware comprising this invention provides means for training reversible belts as well as single direction belts. Sensing and actuating mechanisms control the skewing of the idler roller with a firm non-hunting action. In the first embodiment, only the transverse shaft that supports the cone roller on the far side of the belt need be changed for different width conveyors. In the second embodiment, two directions of lateral straying are detected from the same side of the belt. Coupling means common to both embodiments act on the free end of a standard idler roller that is thereby converted to a training roller. The structure of this invention also avoids the need for the prior art pivoting cradles that have a tendency to collect dirt. A very important feature of the second embodiment is that a single sensing means fits all width belts.

Accordingly, it is an object of this invention to provide improved training means that may be utilized with existing conveyor belt structure.

It is another object of this invention to provide an improved belt trainer that may be used with any width conveyor belt.

Yet another object of this invention is to provide an improved belt trainer that detects lateral motion in either of two directions while the belt is moving in either longitudinal direction.

A particular object is to provide a low cost easily maintained trainer for conveyor belts.

A particular object of this invention is to provide a belt trainer positioned proximate to only one longitudinal edge of the belt but which is capable of sensing lateral movement in either of two lateral or transverse directions.

A further object is to provide a belt trainer having a minimum number of components.

An additional object is to provide belt training apparatus that may be used with existing idler rollers to thereby convert the idler roller to a training roller.

These and other features, objects and advantages of the invention will, in part, be pointed out with particularity and will, in part, become obvious from the following more detailed description of the invention taken in conjunction with the accompanying drawings which form an integral part thereof.

In the various figures of the drawing like reference characters designate like parts.

In the drawing:

FIG. 1 is a transverse, sectional view of a typical conveyor installation utilizing one embodiment of this invention;

FIG. 2 is a sectional, plan view of the conveyor system taken along line 2—2 of FIG. 1;

FIG. 3 is an enlarged, fragmentary, plan view, partly in section, and with certain elements broken away, illustrating the actuator assembly comprising the belt trainer of this invention;

FIG. 4 is a longitudinal, sectional view taken along line 4—4 of FIG. 3;

FIG. 5 is a fragmentary transverse view, partly in section and partly broken away taken along line 5—5 of FIG. 4;

FIG. 6 is a sectional, end elevational view taken along line 6—6 of FIG. 5 illustrating a typical mounting arrangement for an idler roller;

FIG. 7 is a transverse, sectional view of an alternative embodiment of the belt training apparatus;

FIG. 8 is a sectional, plan view of the conveyor system taken along line 8—8 of FIG. 7;

FIG. 9 is a fragmentary, transverse, sectional view of the alternative training device with the training idler removed for clarity;

FIG. 10 is a fragmentary, plan view, partly in section, and with certain components broken away, to illustrate the alternative, belt training device;

Figure 13:
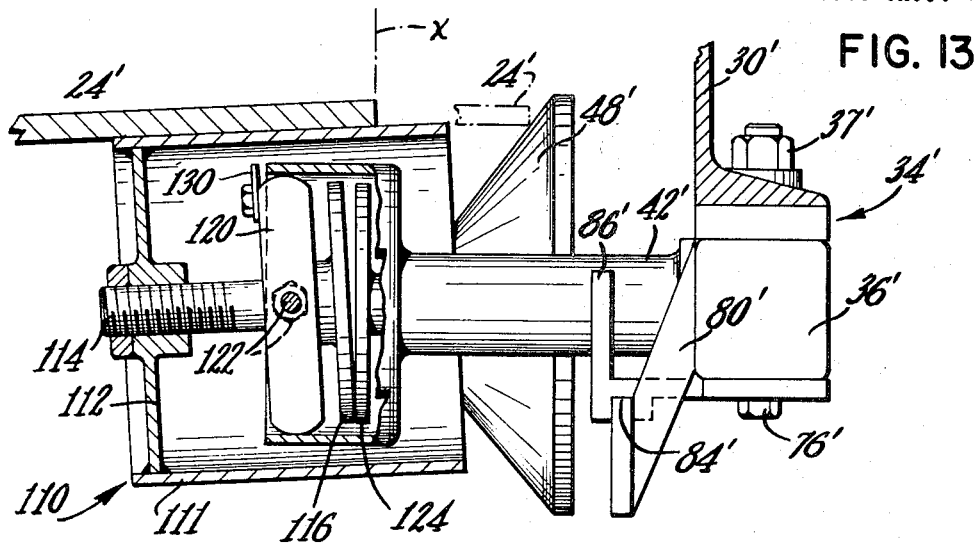
FIG. 13 is a fragmentary view, partly in section, illustrating the two different lateral straying conditions encountered by the second embodiment of this invention.

The first embodiment of the present invention is shown schematically in FIG. 1 and FIG. 2. Conveyor system 20 is comprised of an elongated belt defined by an upper run 22 and a lower run 24. The upper run is supported on a plurality of parallel, troughed belt idlers 26 that are spaced along the length of the conveyor and are suitably supported by brackets 28 mounted on conveyor stringers 30. The lower or return belt is carried by a plurality of similarly positioned idler rollers 32 that are supported from the stringers in a conventional manner.

To provide the required training of the belt, one of the idler rollers is selected and the mounting means at one end thereof is replaced by the actuator assembly 34 which includes coupling means in the form of a similar mounting bracket and sensing means.

Referring now to FIGS. 3, 4, 5 and 6, it will be seen that the actuator assembly is comprised of an elongated, hollow housing 36 secured below the stringers by bolts 37. At one end of the housing a bracket 38 is secured to the side wall, the bracket including a pair of spaced parallel, hollow standoffs 40 and 42, respectively. A shaft 44 is journaled in suitable bearings 45 contained within standoff 40 and supports a bevel gear 46 at the end thereof within the housing. The opposite end of shaft 44 has a first sensing member in the form of a conical roller 48 secured thereto. In order to permit usage of this device with a range of belt widths, it is desirable to adjustably position the roller along the axis of the shaft by means of such devices as set screws, or the like.

Standoff 42 similarly supports a stub shaft 50 that has a bevel gear 52 at its inner end. Coupling means 54 joins a transverse shaft 56 to stub shaft 50. At the far end of transverse shaft 56, an oppositely facing second sensing member, also in the form of a cone roller 58, is mounted. The transverse shaft 56 is journaled in a pillow block 60 (FIG. 2) that is secured to the underside of the stringer 30 at the far side of the conveyor. It will be evident from the foregoing description that the spacing between the cone rollers is determined, in part, by the length of transverse shaft 56 and in part by the axial placement of the rollers on their respective shafts. Transverse shaft 56 is the only component that need be changed to suit the width requirements of each particular conveyor while the axial placement of the rollers permits fine adjustment of the permissible lateral belt straying before correction.

The interior of the housing 36 is provided with a shaft 62 that is journaled at opposite ends in bearings 64. Shaft 62 carries oppositely facing bevel gears 66 and 68 that mate respectively with bevel gears 46 and 52 and which, in combination, define the angularly movable portion of the actuating means. Thus rotation of either of the cone rollers in either direction will cause rotation of shaft 62 about its own axis.

A second shaft 70, coaxial with shaft 62, is also included in the housing and is provided with a lefthand thread 71 at its end opposite to the bevel gears. The threads of the shaft 70 mate with a nut 72 that is captured in a slidable, linearly movable carriage 74. Bolt member 76 passes through a slot 78 in the bottom of the housing and is threadably secured to the carriage. It will be apparent that as shaft 70 rotates, the nut and the carriage can only be translated linearly within the limits defined by the slot. The shaft, the nut, the carriage and the bolt define the linearly movable portion of the actuating means.

As mentioned above, the housing is rigidly secured to the underside of the stringer by means of bolts 37. The housing also is provided with a substantially U-shaped bracket 80 welded or otherwise suitable secured to the inwardly facing surface thereof. A slide plate 82 is mounted on the bottom surface of the actuator housing and includes a channel 84 in which is disposed the connecting portion of the U-shaped bracket 80. Plate 82 also includes an upstanding wall portion 86 that is provided with an irregularly shaped, upwardly facing central opening 88 (FIG. 6) that is arranged to receive the toothed end 90 of the idler roller. The mating arrangement between the opening 88 and the end of the idler roller is conventional and has been used for many years in the conveyor arts. Thus it will be apparent that the actuator assembly, which may also be considered to include the housing 36, and the support wall 86 may be used with existing idler rollers without any need for altering the end of the roller when it is converted to use as a trainer. Bolt 76 also passes through slide plate 82 so that as shaft 62 is rotated about its own axis, nut 72 and carriage 74 are linearly displaced. This causes the channel 84 of plate 82 to slide along the U-shaped bracket 80 and thereby allow wall 86 and opening 88 to arcuately displace the free end 90 of the idler roller. Thus the coupling means of this invention is defined by the plate 82 and its associated elements.

From the foregoing it will be evident that when the return belt becomes misaligned by reason of an external factor, such as an unbalanced load, the size and character of the load, atmospheric conditions, length of conveyor, continuity of service, etc., one longitudinal edge of the belt will engage and rotate one of the cone rollers. The pivotally mounted training roller will then assume either positions 32a or 32b (FIG. 2). The apparatus will function regardless of the direction of the longitudinal motion of the belt and also regardless of which transverse direction the belt strays. Contact between the belt and the cone roller will immediately cause rotation of the shaft by reason of the gear train. The arrangement of the gear train and the traveling nut permits rapid response to any type of lateral belt movement.

Control means are also included to prevent overrunning of the gear train while the training idler roller is being skewed. One form of control means is shown as a simple clutch 100 having a housing 102 in which the opposing ends of shafts 62 and 70 are disposed. It will be seen that shafts 62 and 70 are colinear and coaxial with shaft 70 being threaded at its far end and shaft 62 including a portion of the gear train. The driving clutch plate 104 is secured to shaft section 62 and is adapted to be selectively coupled to a driven clutch plate 106 secured to the unthreaded end of shaft 70. A spring 108, disposed within the housing 102, is utilized to urge the clutch faces towards each other so that under normal conditions the plates are in frictional engagement with each other and rotate together. However, should the nut reach an extreme in its travel, the clutch faces will slip with respect to each other and therefore avoid damage to the gear train. Normally, the edge of the belt will be removed from the cone roller when the belt is properly aligned and therefore actuation of the gear train by the sensing means will cease. The foregoing clutch description is for illustrative purposes only and is not intended to be limiting.

Referring now to FIGS. 7–10, there is shown an alternative arrangement whereby sensing of belt movement in either lateral direction is achieved from one side of the belt only. In this embodiment, the transverse shaft that supported the second cone roller on the opposite side of the belt has been replaced by a sensing means in the form of a roller 110. All other components are the same as in the first embodiment. Therefore, their description will not be repeated, but where the elements are the same, prime reference characters will be utilized.

Roller 110 includes a hollow, elongated housing 111 that is positioned directly underneath one edge of the belt and is in frictional contact therewith. Normally, the edge of the belt coincides with the right hand end of the roller (FIG. 9). A spider 112 supports an axially adjustable threaded central shaft 114 that is provided with a driving plate 116. It will be evident that as the belt moves longitudinally, it will drive the roller as well as housing 111, spider 112, shaft 114 and plate 116. Bearings 118 rotatably support shaft 114 in a trunnion assembly 120 that is pivotable only about a single axis defined by two opposed radial studs 122 positioned at the axial center of housing 111. Thus, if the edge of the belt should stray laterally from its position coincidental with the right hand end of the roller, for example, away from cone member 48′ and towards the point marked "X" (FIGS. 9 and 10), the load acting downwardly on the left hand end of the roller housing 111 will be greater than the load acting on the right hand end of the roller, thus causing the roller to assume the pivoted condition shown in FIG. 13. Conversely, when the belt is centered properly, the entire length of the roller housing surface will be covered by the belt and the load of the belt will be equally distributed over the roller length so that the roller will not be deflected about the trunnion pivots.

As mentioned above, movement of the belt towards the position marked "X" will cause the roller housing to be angularly displaced in the direction shown by arrow a (FIG. 9). When this happens trunnion assembly 120, together with driving plate 116, will also be angularly displaced causing plate 116 to come into frictional contact with a driven plate 124. Shaft 50′ supports driven plate 124 on suitable bearings 126 and is rotated when contact is made between the faces of plates 116 and 124. The contact between the plates will actuate the gear train starting with the bevel gear at the end of shaft 50′ in the same manner as the previous embodiment causing an arcuate displacement of the free end of the idler roller. It will be noted, particularly in FIG. 9, that studs 122 pivotally mount trunnion assembly 120 within an enlarged cylindrical housing 128 that is an integral extension of tubular standoff 50′. The trunnion is permitted limited arcuate motion in the direction shown by arrow a but is prevented from the opposite arcuate motion by means of a stop member 130 bearing against the outer end of the housing 128. The stop member is secured to the trunnion assembly by a bolt 132. Should the belt move in the opposite lateral direction from that described above, that is, to the right of position x, cone 48′ will be engaged by the belt edge and the gear train and idler roller will be activated as hereinbefore described.

Figure 12:
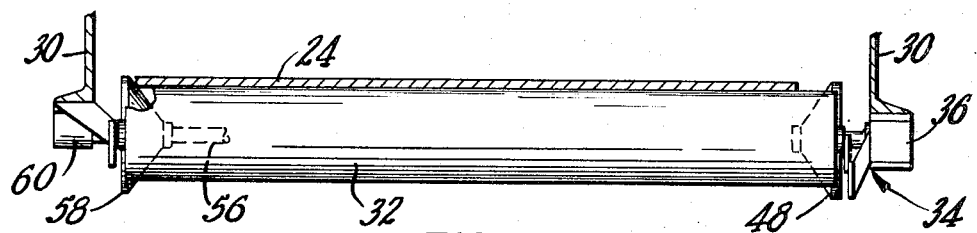
FIG. 12 is another fragmentary, transverse, sectional view showing movement of the belt in a lateral direction opposite to FIG. 11.
Figure 11:
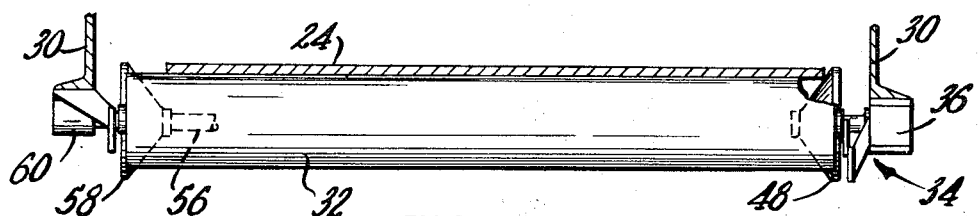
FIG. 11 is a fragmentary, transverse, sectional view showing movement of a typical belt in one lateral direction.

FIG. 11 and FIG. 12 show schematically the two possible lateral displacements of belt 24 used with the first embodiment. In FIG. 11 the belt has moved to the right and is in engagement with the conical surface of roller 48. The actuating and coupling means will be, respectively, angularly and linearly displaced thereby in order to angularly displace the idler roller and to reorient the belt. In FIG. 12 belt 24 has moved to the left and is in engagement with the conical surface of roller 58. Thus, through transverse shaft 56, the actuating and coupling means will again be energized in the manner hereinbefore described. It should be pointed out again at this time that the permissible lateral displacement of the belt may be very accurately determined merely by the placement of the rollers on their respective shafts. Set screws or the like may be used to determine the axial position of both rollers.

FIG. 13 illustrates the functioning of the second embodiment of this invention. Normally, the roller 110 is positioned such that the longitudinal edge of the belt 24′ is coincidental with the right hand edge of the housing 111. Since the trunnion assembly 120 is pivotally mounted at the axial center of the housing, a true running belt will impart equal forces on both halves of the roller. However, when the belt moves to the left (FIG. 13) the load is greater on the left hand side of the roller, causing a pivoting of the trunnion assembly about studs 122 and the frictional engagement of discs 116 and 124 as described above. The actuating and coupling means will then be driven by shaft 50′. Should the belt move laterally to the right, the entire roller will still be covered and will remain equally balanced. Therefore, discs 116 and 124 will not engage. Any excessive lateral movement to the right will cause belt 24′ to engage roller 48′ as shown in phantom outline in FIG. 13, thus driving the actuating and coupling means as hereinbefore described.

The second embodiment of this invention is useful in that the sensing of the belt straying is done from only one side regardless of which direction, either lateral or longitudinal, the belt is moving. A minimum of installation time and cost is required. As in the previous embodiment, the end of the idler roller used as a trainer need not be altered in order to be supported by the actuator mechanism.

Both of the embodiments described are very simple in structure yet very positive in operation. The components are standard for the most part and therefore easy to maintain. Installation may be made on existing structure and requires only the replacement of one hanger member for each idler roller that is to be converted into a training roller. Since the present apparatus requires a bare minimum of space, there is no problem in adapting it to existing installations.

In both embodiments of the invention the sensing means are extremely sensitive to lateral belt movement. The cone rollers which are at the precise limits of permissible lateral movement will start rotating immediately upon contact by the belt edge. Similarly, when the belt shifts with respect to the longitudinal axis of the normally balanced roller, an unbalancing force will immediately pivot the roller about the trunnion axis and thereby actuate the gear train on the training device.

There has been disclosed heretofore the best embodiment of the invention presently contemplated and it is to be understood that various changes and modifications may be made by those skilled in the art without departing from the spirit of the invention.

What is claimed is:

1. An improved training device for use with a conveyor system having opposed, frame members, at least one pivotal idler roller extending transversely between the frame members for arcuate movement in a horizontal plane and an elongated, longitudinally movable endless belt defined by an upper, load-carrying run and a lower, return run in contact with the idler roller, said training device comprising:
   (A) first and second rotatable sensing means positioned in proximity to at least one of the longitudinal edges of the conveyor belt, said sensing means being responsive to the lateral movement of the belt;
   (B) actuating means comprising:
      (a) a first movable portion responsive to the rotation of said sensing means, and
      (b) a second movable portion responsive to the movement of said first portion and arranged to travel between two limiting positions; and
   (C) coupling means connected to said second portion of said actuating means and to the pivotally movable idler roller whereby movement of said sensing means and said actuating means results in an arcuate movement of the idler roller in a horizontal plane; and
   (D) control means interposed between said rotatable sensing means and said coupling means for disengaging said coupling means from said sensing means when said second movable portion has reached the limit of travel in a given direction.

2. The device in accordance with claim 1 wherein said first portion of said actuating means is limited to angular movement and said second portion of said actuating means is limited to linear movement.

3. The device in accordance wtih claim 1 wherein said sensing means comprises a first roller spaced from one longitudinal edge of the belt by a distance equal to the permissible lateral movement thereof in a first direction and a second roller spaced from the opposite longitudinal edge of the belt by a distance equal to the permissible lateral movement thereof in a second direction, said actuating means being responsive to the rotation either of said rollers depending on the direction of lateral belt movement.

4. The device in accordance with claim 3 wherein said first and second rollers have a conical outer surface.

5. The device in accordance with claim 3 wherein each of said rollers includes a gear and said first movable portion of said actuation means includes first and second gears in meshing engagement with said gears of said first and second rollers, respectively, all of said gears defining a train arranged to drive said first portion of said actuating means in response to the rotation of either of said sensing means.

6. The device in accordance with claim 3 including a stub shaft carried by one of the frame members in support of said first roller and a transverse shaft extending between and carried by both of said opposed frame members, said second roller being mounted on said transverse shaft in spaced opposition to said first roller.

7. The device in accordance with claim 1 wherein said actuating means comprises:
   (a) a shaft having a first end coupled to said sensing means for rotation thereby and a threaded second end;
   (b) a nut in meshing engagement with said threaded end of said shaft; and
   (c) an anti-rotation member supporting said nut whereby said nut is limited to linear movement when said shaft rotates about its axis, said coupling means being secured to said nut for linear movement therewith.

8. The device in accordance with claim 7 wherein said shaft is comprised of first and second sections, said sensing means being coupled to said first section, said threads being formed on said second section, there being further included control means interposed between and drivingly connecting said first and second sections to each other when said nut is moving linearly.

9. The apparatus in accordance with claim 8 wherein said control means is a clutch.

10. The apparatus in accordance with claim 1 wherein said coupling means comprises a bracket rigidly secured to said linearly movable portion of said actuating means, said bracket having a socket adapted to receive one end of the idler roller.

11. The apparatus in accordance with claim 10 including a guide member rigidly secured with respect to the frame member, said bracket having a channel arranged to slide on said guide member.

12. The device in accordance with claim 1 wherein said sensing means comprises:
   (a) a first rotatable member spaced from one longitudinal edge of the belt by a distance equal to the permissible lateral movement thereof in a first direction, said first member being operatively connected to said actuating means to define said first sensing means;
   (b) a second pivotable member in rolling contact with the belt proximate the same edge thereof as said first member, said second member being operatively disconnected from said actuating means when the belt is properly oriented to define said second sensing means; and
   (c) means to selectively engage said second sensing means with said actuating means when the belt moves laterally in a second direction away from said first member.

13. The device in accordance with claim 12 wherein said first member is conical and said second member is cylindrical.

14. The device in accordance with claim 12 wherein said means to engage said second sensing means with said actuating means comprises a first rotatably mounted plate operatively connected to said actuating means and a second rotatably mounted plate confrontingly spaced from said first plate, said second plate being integral with said second member and pivotable together therewith about an axis parallel to the direction of longitudinal belt movement whereby when the belt moves laterally in a direction away from said first plate said second member will pivot said second plate into frictional engagement with said first plate, said second member and said second plate thereby imparting a rotational force to said actuating means.

15. The device in accordance with claim 14 wherein said second member is tubular and said first and said second plates are disposed therein.

16. The device in accordance with claim 14 including means limiting the pivoting direction of said second member to a single angular direction in vertical plane.

17. The apparatus in accordance with claim 1 wherein said second sensing means comprises:
   (a) a hollow housing having first and second ends;
   (b) a shaft rotatably disposed in said housing, said shaft having first and second ends, said first shaft end being coupled to said first portion of said actuating means;
   (c) a driven plate rigidly secured to said second end of said shaft;
   (d) a roller member in contact with one edge of the belt and pivotally responsive to lateral belt movement in a direction away from said first sensing means; and
   (e) a driving plate integral with said roller member and pivotally secured to said second end of said housing in spaced opposition to said driven plate, said driving plate being arranged to contact and rotate said driven plate only when said roller member is pivotally displaced whereby said first portion of said actuating means is moved.

18. The apparatus in accordance with claim 17 wherein said roller member is in contact with the edge of the belt proximate said first sensing means.

19. The apparatus in accordance with claim 17 wherein said driving and said driven plates are contained within said second end of said housing.

20. The apparatus in accordance with claim 17 including a rod member rigidly supporting said driving plate and coaxially disposed with respect to said shaft, said rod member being secured to said roller member and trunnion means extending between said rod member and said roller member.

21. The apparatus in accordance with claim 20 wherein said trunnion means is comprised of two studs extending radially in two opposite directions from said rod member to define a pivoting axis, said studs being in support of said roller member at the midpoint of the longitudinal axis of said roller member.

22. The apparatus in accordance with claim 17 including stop means coupled to said driving plate, said stop means being arranged to act on said second end of said housing whereby the pivotal motion of said driving plate is limited to a single angular direction in a plane parallel to the lateral movement of the belt to thereby bring a portion of said driving plate into contact with said driven plate.

References Cited
UNITED STATES PATENTS 1,770,957   6/1930   Veale _____ 198—202

EVON C. BLUNK, *Primary Examiner.*

RICHARD E. AEGERTER, *Examiner.*